United States Patent

Richardson et al.

[15] 3,701,383
[45] Oct. 31, 1972

[54] FRACTURE PROPPING

[72] Inventors: Edwin A. Richardson, Houston, Tex.; Herbert W. Barnes, New Orleans, La.

[73] Assignee: Shell Oil Company, New York, N.Y.

[22] Filed: Jan. 7, 1971

[21] Appl. No.: 104,689

[52] U.S. Cl. .................................166/280, 166/281
[51] Int. Cl. .......................E21b 33/138, E21b 43/26
[58] Field of Search.......166/292, 295, 308, 281, 280

[56] References Cited

UNITED STATES PATENTS

| | | | |
|---|---|---|---|
| 2,986,538 | 5/1961 | Nesbitt et al............166/295 X |
| 3,172,470 | 3/1965 | Huitt et al..............166/281 X |
| 3,323,594 | 6/1967 | Huitt et al.................166/308 |
| 3,343,600 | 9/1967 | Phansalkar et al. ........166/281 |
| 3,393,737 | 7/1968 | Richardson.................166/292 |
| 3,438,440 | 4/1969 | Richardson.................166/292 |
| 3,438,441 | 4/1969 | Richardson.................166/292 |
| 3,500,926 | 3/1970 | Richardson.................166/292 |
| 3,500,927 | 3/1970 | Simpson.....................166/292 |
| 3,586,524 | 6/1971 | Richardson.................166/292 |

Primary Examiner—Stephen J. Novosad
Attorney—H. W. Coryell and Harold L. Denkler

[57] ABSTRACT

Fractures within subterranean reservoir formations are propped open by injecting electroless metal plating solution at a rate that hydraulically separates the walls of the fracture while fluid is leaking into the fracture walls and, after the walls have been converted to structures which are integral and porous, disposing a fracture propping material between the fracture walls.

5 Claims, 3 Drawing Figures

PATENTED OCT 31 1972 3,701,383

Edwin A. Richardson
Herbert W. Barnes
INVENTORS ced with distance away from the well to which
FRACTURE PROPPING

BACKGROUND OF THE INVENTION

This invention relates to a well treating process for opening a fracture into a subterranean reservoir formation and propping the fracture open by filling it with granular material.

Numerous procedures and compositions have been developed for forming fractures and injecting granular fracture propping materials to keep the fractures open. In general, such fractures are initiated by contacting an earth formation with a fluid and increasing the pressure on the fluid to a pressure that cannot be confined by the earth formation. This causes a fracture and such a fracture is extended by injecting fluid into it at a rate sufficient to force the fracture to keep enlarging in order to accommodate the volume of the inflowing fluid. While the fracture is being formed and extended, fluid is continually flowing into the earth formation that forms the walls of the fracture. The rate of leakage into the fracture walls is to some extent controllable by the composition, viscosity and amount of pressure that is applied to the inflowing fluid. The extension of a fracture is terminated when the rate of leakage into the fracture walls becomes equal to the rate of inflow into the fracture. Whenever the rate at which fluid is injected into the fracture is reduced, the pressure within the fracture becomes reduced by the leakage of fluid into the pores of the surrounding earth formation.

Well treatments for forming and propping fractures are usually employed in reservoir formations which are relatively tight, e.g., have permeabilities of from about several tenths of a millidarcy to several hundred millidarcies. The fracturing operations are employed in order to provide relatively highly permeability flow channels that interconnect the well and the reservoir or, in effect, increase the effective size of the well borehole.

In certain near ideal situations, fractures can be propped open to widths of as much as about one-fourth inch and extended for distances of up to about 100 feet or more. In other situations, the walls of the fractures tend to be soft enough to deform and close around the grains of a propping material until the permeability within the fracture is reduced to substantially that of the reservoir. It is this latter type of situation to which the present invention is directed.

U.S. Pat. No. 3,428,122 describes a procedure for stabilizing the openings within fractures in relatively soft rocks that tend to deform and close around the grains of a fracture propping material. In the patented process, the fracture is, in sequence, initiated, extended, filled with propping material, treated with a specified epoxy resin-forming sand consolidating material and overflushing liquid that is a adapted for use at high temperatures, and then shut in for at least several hours, in order to allow the resin to harden. The steps of emplacing the propping material and shutting in the well before the fracture walls have been consolidated to integral structures are inherently disadvantageous. As soon as the well is shut in, the fluid pressure within the fracture begins to decline and soon becomes substantially equal to the reservoir fluid pressure. The fracture walls tend to be pressed together by the compressive stresses existing within the subterranean environment of the reservoir. This causes a loss of some or all of the fracture permeability, since the fracture walls tend to deform around the grains of the propping material before the resin has hardened. In addition, resin-depositing consolidation treatments tend to cause a significant loss of permeability due to the volume of the resin that is deposited between the grains of the propping material.

SUMMARY OF THE INVENTION

In accordance with the present invention, a fracture is propped by the following combination of steps: An electroless metal plating solution is injected into the fracture at a rate sufficient to separate the fracture walls along the distance away from the well to which the fracture is to be kept open. After the fracture walls have been consolidated into structures that are integral and permeable, by the plating action of the plating solution leaking into the walls, a granular propping material is emplaced between the fracture walls. Then, the fracture walls are allowed to close, after they have been consolidated to structures adapted to be supported along the maximum diameters of the propping material grains.

DESCRIPTION OF THE INVENTION

Figure 1:
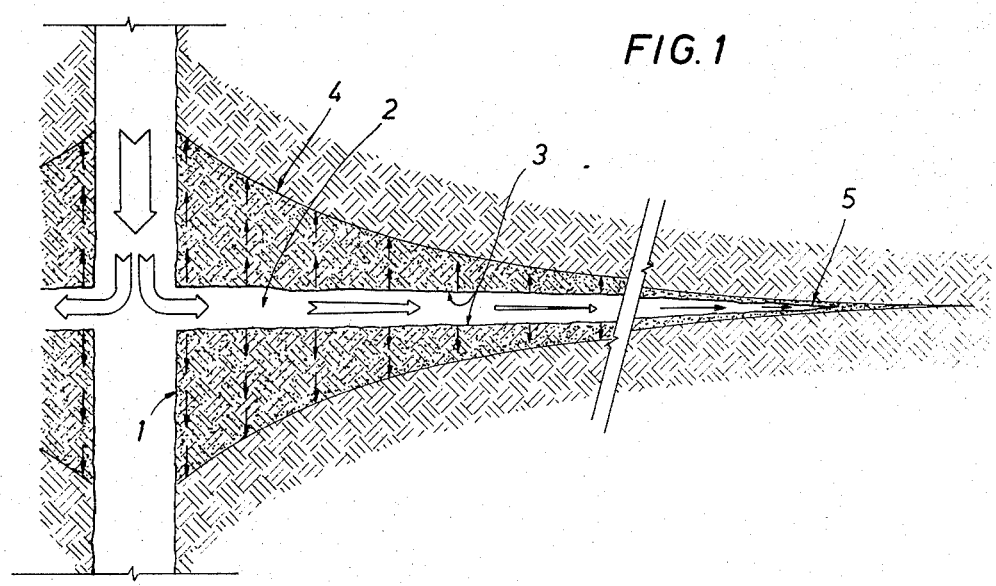
FIG. 1 is a schematic cross-sectional illustration of a fracture being held open by fluid being injected into the fracture.

FIG. 1 illustrates events which occur when fluid is injected into a fracture within a subterranean reservoir. Fluid flows through bore hole wall 1 into fracture interior 2 and through fracture walls 3 with the directions and rates indicated by the arrows. Within the bore hole and the immediately adjacent portion of the fracture interior, the rate and volume of the fluid inflow is relatively high. The fluid leaks through the fracture walls to form a fluid invaded zone 4 that becomes largest near the well and diminishes with distance away from the well. As an increment of fluid flows through the fracture, more and more of it is lost by leakage into the walls. The fracture remains closed or terminates at a point, such as point 5, where the rate of leakage becomes equal to the rate of inflow. Such effects are substantially the same when the fracture orientation is primarily horizontal or vertical or somewhere in between.

The rate at which fluid could flow through the fracture walls 3 tends to be substantially constant along substantially all of their surface area, but the volume that flows through each increment diminishes with distance away from the well and is a function by the effective viscosity of the fluid and the pressure at which the fluid is injected. The extent of the hydraulically induced separation between the fracture walls 3 decreases with decreases in fluid viscosity and/or pressure and/or rate of inflow. When the rate of inflow or viscosity is reduced, the pressure is reduced and the wall separation is reduced.

As known to those skilled in the art, the distance to which the fracture is extended away from the well can, in general, be increased by increasing the viscosity of the fluid that is injected into the fracture. This reduces the rate of leakage into the walls and allows the fluid to be inflowed into the fracture faster than it is leaking into the walls for a longer distance away from the well. Where it is desirable to control the extent of the fluid invasion into the reservoir, fluids of different viscosities can be injected into the fracture. By first injecting a highly viscous fluid, the near well portions of the fracture walls are permeated with fluid that has a slow rate of flow within the reservoir rock. A less viscous fluid can then be injected to move within the fracture through the near well portion with relatively low frictional resistance.

Figure 2:
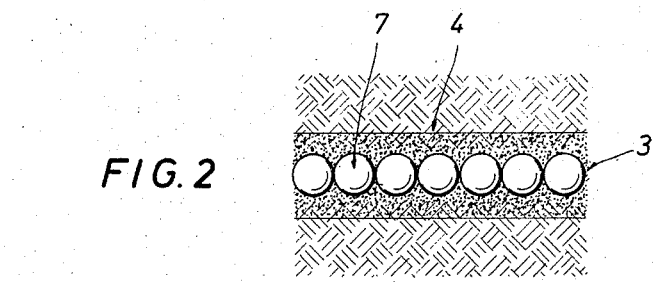
FIG. 2 is a similar illustration of a fracture in which the walls have been allowed to close against the grains of a fracture propping material.

FIG. 2 illustrates the effects of emplacing propping material grains 7 in a fracture and allowing the walls 3 to close against such grains when the walls are too loosely consolidated to be supported along the outer diameters of the propping grains. In previously proposed fracture forming and propping operations, the propping material is usually emplaced within the fracture before the fracture walls are consolidated. A sand consolidating fluid is then injected through the propped fracture to consolidate the grains of the propping material and the walls of the fracture. The extent to which the permeability within the fracture exceeds that within the reservoir rock is dependent on the efficiency with which the inflowing fluid displaces resin from between the fracture propping grains and forms rigid bonds between the grains of the reservoir earth formation before the walls of the fracture are deformed around the grains of the propping material.

Figure 3:
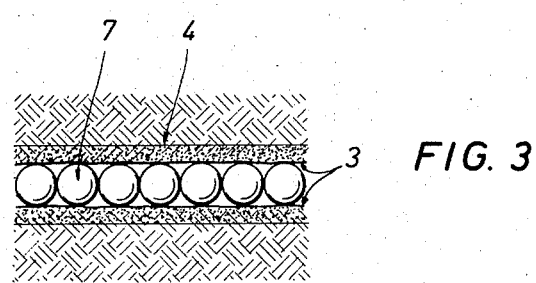
FIG. 3 is a similar illustration of a propped fracture in which the walls have been treated in accordance with this invention.

FIG. 3 illustrates the effects of propping a fracture in accordance with this invention. The fracture walls 3 are separated hydraulically by injecting a relatively viscous electroless metal plating solution that converts the fracture walls to structures that are integral and porous before the propping grains 7 are emplaced. As shown by the drawing, this tends to cause walls 3 to be much less deformed around the propping grains and leaves a much greater permeability within the fracture than can be obtained when the propping materials are emplaced before the fracture walls have been consolidated.

The electroless metal plating sand consolidating solution that is injected into the fractures to consolidate their walls while they are hydraulically supported is preferably formulated and injected in the manner described in one or more of U.S. Pat. No. 3,393,737 (on sand consolidation), U.S. Pat. No. 3,500,926 (on extending the plating zone), U.S. Pat. No. 3,438,441 (on a high ph formulation) and, U.S. Pat. No. 3,438,440 (on a low ph formulation). In such procedures, the walls of the fracture are contacted with a solution of activating components capable of activating the normally non-catalytic grains of an earth formation relative to an electroless metal plating and with a solution of metal plating components, comprising dissolved metal and reducing material adapted to affect an electroless metal plating within an earth formation.

In the present process, the fluid used in initiating and propagating the fracture can comprise (a) a mixture of electroless metal plating activating and plating materials (b) a slug containing the activating materials followed by a slug containing the plating materials or (c) a slug of substantially any fluid followed by either (a) or (b). The fracture propping materials can be deposited within the fracture by pumping in a slurry of substantially any granular solid material in substantially any liquid and can utilize techniques and procedures that are currently available. The deposition of the fracture propping material within the fracture can be followed by an additional injection of activating and plating materials for affecting electroless metal plating. One advantage of such sand consolidating fluids is the relatively small extent to which they reduce the permeability of a mass of grains being consolidated.

In a preferred procedure, a fracture is initiated and extended by injecting a sequence of slugs comprising: a relatively viscous liquid; an alternating sequence of slugs of electroless metal plating activating and plating materials; a slurry of granular propping material; and, at least one each of, additional slugs of the activating and plating materials. In this procedure, the rate of fluid leakage into the earth formation pores is initially reduced by means of the spearhead of relatively viscous fluid. This tends to reduce the wall permeability immediately adjacent to the bore hole and to equalize the amount of metal deposition within the walls of the fracture.

In a preferred metal plating solutions for consolidating the walls of fractures within reservoirs having relatively high temperatures, such as deep reservoirs, (e.g. below about 6,000 feet), the reducing agent for effecting the electroless metal plating is a phosphite. The metal used in such solutions is preferably a solution of a nickle complex with ammonia or a chelating agent. Such plating solution components provide good reaction rate control at temperatures of about 250° to 400°F and are adapted to yield consolidated masses having compressive strengths in the order of 20,000 to 40,000 psi.

With respect to treating the walls of fractures in reservoirs having low temperatures, such as shallow reservoirs, alkaline electroless metal plating solution formulations tend to provide sufficiently rapid plating rates but produce consolidated structures having a low resistance to stress and being subject to cracking. In such situations, the addition of a small amount of an organic sulfimide, such as saccharin, tends to provide excellent metal coatings which are strong and stable.

In practicing this invention, the reaction rates and the concentrations of the activating and plating solutions should be adjusted to provide relatively fast reactions at the reservoir temperatures and thick platings per volume of solution. In addition, the viscosities of at least the plating solution and preferably both the plating and the activating solutions should be from about 0.1 to 10 centipoises at the reservoir temperature. The plating and/or activating solution viscosities can readily be increased by incorporating into such solutions one or more of substantially any of the thickening materials for aqueous solutions. Such thickeners may include carboxy methyl cellulose, partially hydraulized polyacrylamids, e.g. those available under the trade names, Pusher and Separan, the biopolymers, e.g. those available under the trade names, Polytrans, Kelzans, and the like water thickening agents.

What is claimed is:

1. A process for propping open a fracture within a relatively soft subterranean reservoir formation, comprising:

separating the fracture walls hydraulically by pumping an electroless metal plating solution into the fracture at a rate exceeding the rate of leakage into the fracture walls; and after the fracture walls have been converted to integral and permeable structures by the plating of metal within their pores, positioning a granular fracture propping material between the walls of the fracture.

2. The process of claim 1 in which the plating solution viscosity is at least 0.1 centipoise.

3. The process of claim 1 in which said electroless metal plating solution is preceded by a slug of electroless metal plating activator solution which, in turn, is preceded by a slug of relatively highly viscous fracture initiating liquid.

4. The process of claim 3 in which said fracture initiating liquid is followed by an alternating sequence of slugs of said activating and plating solutions.

5. The process of claim 4 in which an alternating sequence of slugs of said activating and plating solutions is injected both before and after the emplacement of said fracture propping material.

* * * * *